United States Patent
Wang et al.

(10) Patent No.: US 10,489,595 B2
(45) Date of Patent: Nov. 26, 2019

(54) METHOD AND DETECTION CIRCUIT FOR DETECTING SECURITY CHIP OPERATING STATE

(71) Applicant: HUAWEI TECHNOLOGIES CO., LTD., Shenzhen, Guangdong (CN)

(72) Inventors: Haofeng Wang, Xi'an (CN); Jiayin Lu, Xi'an (CN); Chongliang Ma, Xi'an (CN)

(73) Assignee: Huawei Technologies Co., LTD., Shenzhen (CN)

( * ) Notice: Subject to any disclaimer, the term of this patent is extended or adjusted under 35 U.S.C. 154(b) by 188 days.

(21) Appl. No.: 15/814,115

(22) Filed: Nov. 15, 2017

(65) Prior Publication Data
US 2018/0137283 A1 May 17, 2018

(30) Foreign Application Priority Data
Nov. 15, 2016 (CN) .......................... 2016 1 1021892

(51) Int. Cl.
*G06F 21/57* (2013.01)
*G06F 1/06* (2006.01)
(Continued)

(52) U.S. Cl.
CPC .............. *G06F 21/57* (2013.01); *G06F 1/06* (2013.01); *G06F 11/3024* (2013.01);
(Continued)

(58) Field of Classification Search
CPC ...... G06F 21/57; G06F 21/75; G06F 11/3024; G06F 11/3058; G06F 1/06;
(Continued)

(56) References Cited

U.S. PATENT DOCUMENTS

| | | | |
|---|---|---|---|
| 2005/0081040 A1* | 4/2005 | Johnson | G06F 21/32 713/176 |
| 2008/0148343 A1* | 6/2008 | Taniguchi | G06F 11/2236 726/1 |

(Continued)

FOREIGN PATENT DOCUMENTS

| | | |
|---|---|---|
| CN | 1971530 | 5/2007 |
| CN | 102520754 | 6/2012 |

(Continued)

OTHER PUBLICATIONS

Zhang et al., "A security coprocessor embedded system-on-chip architecture for smart metering, control and communication in power grid," 2014 12th IEEE International Conference on Solid-State and Integrated Circuit Technology (ICSICT) Year: 2014 | Conference Paper | Publisher: IEEE.*

(Continued)

*Primary Examiner* — Roderick Tolentino
(74) *Attorney, Agent, or Firm* — Fish & Richardson P.C.

(57) ABSTRACT

The present invention provide a method and a detection circuit for detecting a security chip operating slate. The detection circuit includes: a first register unit, a triggering unit, a delay unit, a routing unit, and a second register unit, where the second register unit is connected to the triggering unit. A first signal is delayed in the delay unit, to obtain a second signal, a third signal is obtained according to the second signal, and logical operation is performed on the first signal and the third signal, to output a level signal to trigger an alarm unit. Because each unit may be implemented by using a digital circuit, a size of the circuit can be reduced.

13 Claims, 10 Drawing Sheets

(51) Int. Cl.
*G06F 11/30* (2006.01)
*G06F 11/34* (2006.01)
*G06F 21/72* (2013.01)

(52) U.S. Cl.
CPC ........ *G06F 11/3058* (2013.01); *G06F 11/348* (2013.01); *G06F 11/3495* (2013.01); *G06F 21/72* (2013.01); *G06F 2221/034* (2013.01)

(58) Field of Classification Search
CPC .... G06F 11/3495; G06F 21/72; G06F 11/348; G06F 2221/03
See application file for complete search history.

(56) References Cited

U.S. PATENT DOCUMENTS

| | | | |
|---|---|---|---|
| 2009/0044038 A1* | 2/2009 | Lee | G06F 1/08 713/501 |
| 2009/0063890 A1* | 3/2009 | Ware | G06F 13/1689 713/601 |
| 2010/0026358 A1 | 2/2010 | Bancel et al. | |
| 2014/0020097 A1* | 1/2014 | Riou | G06F 21/554 726/22 |
| 2014/0281643 A1 | 9/2014 | Tiri et al. | |
| 2015/0007356 A1* | 1/2015 | Hauke | G06F 21/81 726/36 |
| 2015/0052622 A1* | 2/2015 | Cabler | G09C 1/00 726/34 |
| 2015/0067771 A1* | 3/2015 | Love | G06F 21/44 726/2 |
| 2015/0074422 A1* | 3/2015 | Meyer | G06F 21/556 713/189 |
| 2015/0082420 A1* | 3/2015 | Love | G06F 21/6218 726/16 |
| 2015/0121519 A1* | 4/2015 | Hauke | G06F 1/26 726/22 |
| 2015/0186676 A1* | 7/2015 | Arora | G06F 21/725 713/187 |
| 2016/0377677 A1* | 12/2016 | Tille | G06F 11/267 714/727 |

FOREIGN PATENT DOCUMENTS

| | | |
|---|---|---|
| CN | 103605597 | 2/2014 |
| CN | 105159374 | 12/2015 |
| EP | 2149886 | 2/2010 |
| EP | 2960665 | 12/2015 |

OTHER PUBLICATIONS

Menichelli et al. "High-Level Side-Channel Attack Modeling and Simulation for Security-Critical Systems on Chips," IEEE Transactions on Dependable and Secure Computing Year: 2008 | vol. 5, Issue: 3 | Journal Article | Publisher: IEEE.*
International Search Report, dated Aug. 30, 2017, in International Application No. PCT/CN2017/086212 (5 pp.).
Written Opinion of the International Searching Authority, dated Aug. 30, 2017, in International Application No. PCT/CN2017/086212 (8 pp.).
Jie Li et al., *At-Speed Delay Characterization for IC Authentication and Trojan Horse Detection*, 2008 IEEE International Workshop on Hardware-Oriented Security and Trust, IEEE, Piscataway, NJ, USA, Jun. 9, 2008, XP031283303 (7 pp.).
Extended European Search Report, dated Mar. 21, 2018, in European Application No. 17201774.1 (6 pp.).

* cited by examiner

<Prior Art>

METHOD AND DETECTION CIRCUIT FOR DETECTING SECURITY CHIP OPERATING STATE

CROSS-REFERENCE TO RELATED APPLICATION

This application claims priority to Chinese Patent Application No. 201611021892.9, filed on Nov. 15, 2016, which is hereby incorporated by reference in its entirety.

TECHNICAL FIELD

Embodiments of the present invention relate to the field of information security technologies, in particular, to a method and a detection circuit for detecting a security chip operating state, and a security chip.

BACKGROUND

A security chip performs highly reliable encryption processing on data stored in the security chip, so that the data is hardly illegally stolen. An operating condition (Operating Condition) (such as, an electrical condition) in which the security chip operates needs to ensure that a circuit (such as a CPU circuit, an encryption and decryption circuit, and a random number generation circuit) in the security chip normally operates. Once a parameter of the electrical condition in which the security chip operates exceeds a withstanding threshold of a circuit in the security chip, an error may occur during operation of the circuit in the security chip. In this case, the data stored in the security chip may leak.

At present, various sensors (sensor) are integrated in the security chip, and are respectively used to monitor condition components (such as a voltage, a temperature, light, and clock information) of the operating condition in which the security chip operates. The sensors analyze the condition components by using a signal processing module, so as to determine whether the operating condition in which the security chip operates is proper. If the operating condition is improper, an alarm is generated. However, at present, monitoring on each of the foregoing condition components is separately performed within the security chip. For example, as shown in FIG. 1, a voltage sensor is used to monitor the voltage, a temperature sensor is used to monitor the temperature, an optical sensor is used to monitor an incident ray, and a frequency sensor is used to monitor the clock information. The various sensors act independent of each other, and all the sensors are mainly an analog circuit.

However, an area of the analog circuit cannot be significantly reduced as a process evolves. Therefore, a larger area of the analog circuit indicates easier identification of the analog circuit in a security chip layout, and an attack risk is relatively high.

SUMMARY

Embodiments of the present invention provide a method and a detection circuit for detecting a security chip operating state, so as to resolve a prior-art problem that an analog circuit is more easily identified from a security chip layout as an area of the analog circuit increases and an attack risk is relatively high.

To achieve the foregoing objective, the embodiments of the present invention use the following technical solutions:

According to a first aspect, an embodiment of the present invention provides a circuit for detecting a security chip operating state, including: a first register unit, a triggering unit and a delay unit that are connected to the first register unit, a routing unit connected to the delay unit, and a second register unit connected to the routing unit, where the second register unit is connected to the triggering unit; the first register unit is configured to: when a clock signal is valid, obtain a first signal according to a triggering signal that is input to the first register unit, and output the first signal to the delay unit and a second logic gate unit; the delay unit is configured to: delay the first signal for different time periods to generate multiple delayed signals, and when the clock signal is valid, generate multiple second signals according to the multiple delayed signals; the routing unit is configured to: select one second signal from the multiple second signals, and output the selected second signal to the second register unit; the second register unit is configured to: when the clock signal is valid, generate a third signal according to the received second signal and output the third signal to the triggering unit; and the triggering unit is configured to: perform logical operation on the third signal and the first signal to obtain a level signal, and determine, according to the level signal, whether to output an alarm signal.

This embodiment of the present invention provides the circuit for detecting a security chip operating state, including: the first register unit, the triggering unit and the delay unit that are connected to the first register unit, the routing unit connected to the delay unit, and the second register unit connected to the routing unit, where the second register unit is connected to the triggering unit. In this embodiment of the present invention, the first signal is delayed to obtain the multiple delayed signals, and the multiple second signals are generated according to the multiple delayed signals. One second signal is selected from the multiple second signals, and the selected second signal is output to the second register unit to obtain the third signal and the logical operation is performed on the third signal and the first signal to obtain the level signal. It is determined, according to the level signal, whether to output the alarm signal. In this embodiment of the present invention, each unit may be implemented by using a digital circuit, and therefore a size of the circuit can be reduced, so that it is difficult to identify the circuit from a security chip layout, and reliability of a security chip is improved. Therefore, it can be determined, by determining a delay of the first signal transmitted in a delay link, whether an operating state of the circuit provided in this embodiment of the present invention for detecting a security chip operating state is a normal operating condition.

With reference to the first aspect, in a first possible implementation of the first aspect, the routing unit is specifically configured to: receive a selection signal used to instruct to select one second signal from second signals generated by all third register units, and select, according to the selection signal, one second signal from the second signals generated by all the third register units. A performance boundary of the circuit is determined by the delay of the first signal, and therefore, different delays of the first signal enable the circuit to have different performance boundaries. In this way, at different performance boundaries, the circuit that is for detecting a security chip operating state and that is in a different operating state can detect in time whether the operating state is a normal operating slate of the security chip.

With reference to the first aspect or the first possible implementation of the first aspect, in a second possible implementation of the first aspect, the triggering unit is specifically configured to: when the level signal is a high level signal, output an alarm signal.

With reference to any one of the first aspect or the first and the second possible implementations of the first aspect, in a third possible implementation of the first aspect, the delay unit includes at least one third register unit and a delay link connected to each of the at least one third register unit; the delay link is configured to; delay the first signal for the different time periods to generate the multiple delayed signals, and transfer the multiple delayed signals to different third register units; and each third register unit is configured to: receive the delayed signal, and when the clock signal is valid, generate the second signal according to the delayed signal transferred to the third register unit.

With reference to any one of the first aspect or the first to the third possible implementations of the first aspect, in a fourth possible implementation of the first aspect, the circuit further includes a phase-inverting unit, an output end of the phase-inverting unit is connected to an input end of the first register unit, and an input end of the phase-inverting unit is connected to an output end of the first register unit; and the phase-inverting unit is configured to: invert a phase of the first signal that is output from the output end of the first register unit, and input a signal obtained by means of the phase inversion to the input end of the first register unit. This ensures that signals at the input end and the output end of the first register unit always maintain opposite states. When the clock signal is at a rising edge moment, a value at the output end of the first register unit is changed to that of the input end of the first register unit, so as to implement signal phase inversion once at the output end.

With reference to any one of the first aspect or the first to the third possible implementations of the first aspect, in a fourth possible implementation of the first aspect, the delay link includes multiple delay elements, and each delay element is configured to delay, for a preset cycle, a signal that is input to the delay element, so that delayed signals for different time periods are generated after the first signal passes through different quantities of delay elements.

With reference to any one of the first aspect or the first to the fourth possible implementations of the first aspect, in a fifth possible implementation of the first aspect, the first register unit, the second register unit, and the third register unit all use a D trigger; and the routing unit uses a MUX multiplexer.

With reference to any one of the first aspect or the first to the fifth possible implementations of the first aspect, in a sixth possible implementation of the first aspect, a logic gate unit uses an XOR gate circuit.

With reference to any one of the first aspect or the first to the sixth possible implementations of the first aspect, in a seventh possible implementation of the first aspect, the circuit further includes: a fourth register unit, a fifth register unit, and a first logic gate unit, where the fourth register unit is connected to the second register unit, the fifth register unit, and the first logic gate unit; the fourth register unit is configured to: receive the third signal that is output from the second register unit, and when the clock signal is valid, generate a fourth signal, and output the fourth signal to the fifth register unit and the first logic gate unit; the fifth register unit is configured to: receive the fourth signal that is output from the fourth register unit, and when the clock signal is valid, generate a fifth signal according to the fourth signal, and output the fifth signal to the first logic gate unit; and the first logic gate unit is configured to generate a triggering signal according to the fourth signal and the fifth signal, where the triggering signal is used to indicate that an internal element of the circuit is normal. The fourth register unit, the fifth register unit, and the first logic gate unit are disposed, so that whether an internal circuit of the circuit is in a normal state can be detected in time, to ensure that the circuit for detecting a security chip operating state normally operates.

With reference to any one of the first aspect or the first to the seventh possible implementations of the first aspect, in an eighth possible implementation of the first aspect, the triggering unit includes the second logic gate unit and an alarm unit, the second logic gate unit is connected to the first register unit, the alarm unit is connected to the second logic gate unit, and the second logic gate unit is further connected to the second register unit; the second logic gate unit is configured to: perform the logical operation on the third signal and the first signal to obtain the level signal, and send the level signal to the alarm unit; and the alarm unit is configured to determine, according to the level signal, whether to output the alarm signal.

According to a second aspect, an embodiment of the present invention provides a method for detecting a security chip operating state, where the method is applied to a circuit for detecting a security chip operating state, and the method provided in this embodiment of the present invention includes: when a clock signal is valid, obtaining a first signal according to a triggering signal that is input to the circuit for detecting a security chip operating state; delaying the first signal to obtain multiple delayed signals, where a delay of each delayed signal in the multiple delayed signals is different; obtaining multiple second signals according to the multiple delayed signals; selecting one second signal from the multiple second signals, and when the clock signal is valid, generating a third signal according to the selected second signal; when the clock signal is valid, performing logical operation on the first signal and the third signal to obtain a level signal; and determining, according to the level signal, whether to output an alarm signal.

With reference to the second aspect, in a first possible implementation of the second aspect, before the selecting one second signal from the multiple second signals, the method provided in this embodiment of the present invention further includes: receiving a selection signal used to instruct to select one second signal from the multiple second signals; and selecting one second signal from the multiple second signals according to the selection signal.

With reference to the second aspect or the first possible implementation of the second aspect, in a second possible implementation of the second aspect, after the obtaining a first signal according to a triggering signal that is input to the circuit for detecting a security chip operating state, the method further includes: inverting a phase of the first signal that is output at a current moment, so as to determine a triggering signal that is to be input to the security chip in a next moment.

With reference to any one of the second aspect or the first and the second possible implementations of the second aspect, in a third possible implementation of the second aspect, the determining, according to the level signal, whether to output an alarm signal includes: when the level signal is a high level signal, outputting an alarm signal.

With reference to any one of the second aspect or the first to the third possible implementations of the second aspect in a fourth possible implementation of the second aspect, the method provided in this embodiment of the present invention further includes: when the clock signal is valid, generating a fifth signal according to the third signal; when the clock signal is valid, generating a sixth signal according to the fifth signal; and generating, according to the fifth signal and the sixth signal, a triggering signal used to indicate that an element of the circuit is normal.

According to a third aspect, an embodiment of the present invention provides a security chip protection circuit, where the security chip protection circuit is applied to a security chip, the security chip includes at least one detection circuit, any one of the detection circuit is configured to: detect a condition state in a detection range of the detection circuit. The detection circuit is the circuit for detecting a security chip operating state according to any one of the first aspect or the first to the seventh possible implementations of the first aspect, and determines, according to the condition state, whether to send an alarm signal. The circuit for detecting a security chip operating state has a same operating condition with the security chip, and the operating condition includes at least a clock cycle of a clock signal, a power supply, and a temperature.

According to the security chip protection circuit in this embodiment of the present invention, the security chip protection circuit is applied to the security chip, the security chip includes at least one detection circuit, any one of the detection circuit is configured to: detect the condition state in a preset detection range of the detection circuit, and determines, according to the condition state, whether to send an alarm signal. Because the detection circuit is the circuit for detecting a security chip operating state according to any one of the first aspect or the first to the seventh possible implementations of the first aspect, the circuit for detecting a security chip operating state can automatically complete, according to the operating state of the security chip, detection that the operating state of the security chip is a secure state. All internal components of the circuit for detecting a security chip operating state use a digital circuit, and therefore are not affected by aging or a change of the operating state. In addition, because a size of the digital circuit used in the circuit for detecting a security chip operating state is small enough, a quantity of the circuits that are for detecting a security chip operating state and that are disposed in the security chip is not limited by a size of the security chip. In addition, at least one circuit for detecting a security chip operating state is arranged in the security chip, so that when a local operating condition of the security chip is changed, an alarm can be generated in time. Certainly, the security chip provided in this embodiment of the present invention can also generate an alarm in time when an overall operating condition of the security chip is changed.

With reference to the third aspect, in a first possible implementation of the third aspect, when two or more detection circuits exist in the security chip, the two or more detection circuits are located in different positions. The circuits for detecting a security chip operating state are arranged in different positions in the security chip, and each circuit for detecting a security chip operating state has its detection range; therefore, when any local operating state of the security chip is changed (for example, a locality of the security chip is attacked, and consequently a voltage of the locality is changed, but a voltage in another position of the security chip is not changed), the security chip within the layout can detect the change of the operating state in time, and when a level signal caused by the change of the operating state can trigger an alarm unit, the alarm unit sends an alarm signal in time.

According to a fourth aspect, an embodiment of the present invention provides a security chip detection method, where the method is applied to the security chip according to the third aspect or the first possible implementation of the third aspect in the embodiments of the present invention, and the method includes: setting, according to an input selection signal, a target third register unit selected for each detection circuit, where the selection signal is used to instruct a routing unit to select the target third register unit from at least one third register unit; and after the security chip is started, if any detection circuit in the at least one detection circuit sends an alarm signal, it indicates that the security chip operates in an insecure operating condition at a current moment.

With reference to the fourth aspect, in a first possible implementation of the fourth aspect, before the any detection circuit in the at least one detection circuit generates the alarm signal, the method provided in this embodiment of the present invention further includes: obtaining an operating state of each detection circuit in the at least one detection circuit at the current moment; and determining, by each detection circuit according to a relationship between the operating state of each detection circuit at the current moment and a performance boundary of the detection circuit, whether to send the alarm signal.

With reference to the fourth aspect or the first possible implementation of the fourth aspect, in a second possible implementation of the fourth aspect, the determining, by each detection circuit according to a relationship between the operating state of each detection circuit at the current moment and a performance boundary of the detection circuit, whether to send the alarm signal includes: when an operating state of a first detection circuit in the at least one detection circuit at the current moment is outside a performance boundary of the first detection circuit, sending an alarm signal by the first detection circuit, where the first detection circuit is any detection circuit in the at least one detection circuit.

With reference to any one of the fourth aspect or the first and the second possible implementations of the fourth aspect, in a third possible implementation of the fourth aspect, the determining, by each detection circuit according to a relationship between the operating state of each detection circuit at the current moment and a performance boundary of the detection circuit, whether to send the alarm signal further includes: when an operating state of a first detection circuit in the at least one detection circuit at the current moment is within a performance boundary of the first detection circuit, skipping sending an alarm signal by the first detection circuit, where the first detection circuit is any detection circuit in the at least one detection circuit.

With reference to any one of the fourth aspect or the first to the third possible implementations of the fourth aspect, in a fourth possible implementation of the fourth aspect, after the any detection circuit in the at least one detection circuit sends the alarm signal, the method provided in this embodiment of the present invention further includes: resetting the security chip by using a preset protection measure, so that the security chip is restored to an initial state.

DESCRIPTION OF EMBODIMENTS

It should be noted that, in embodiments of the present invention, a determiner such as "a first", "a second", and "a third" written before an electronic element is used to distinguish multiple electronic elements of a same type, and is not used as a qualified limited description. For example, "a first a third register unit" represents merely one of third register units, and not represents the first one of the third register units.

Figure 1:
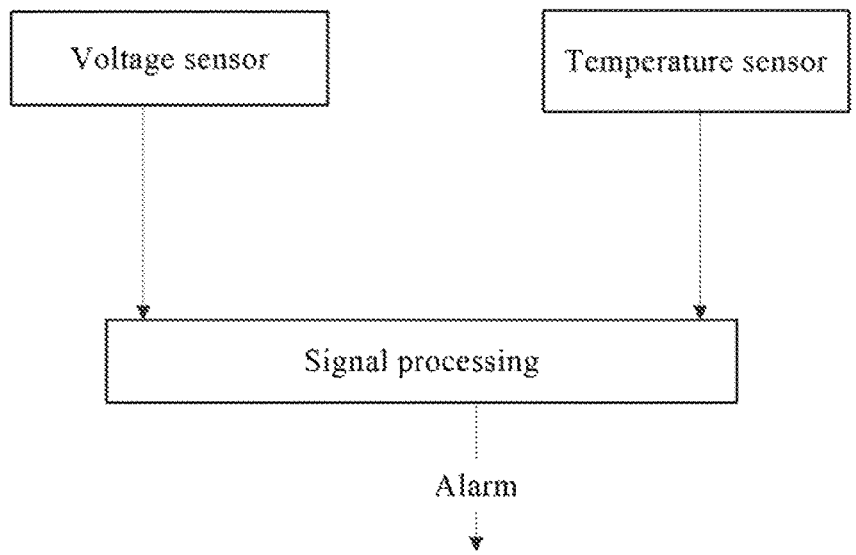
FIG. 1 is a schematic diagram of detection within a security chip according to the prior art.
Figure 2A:
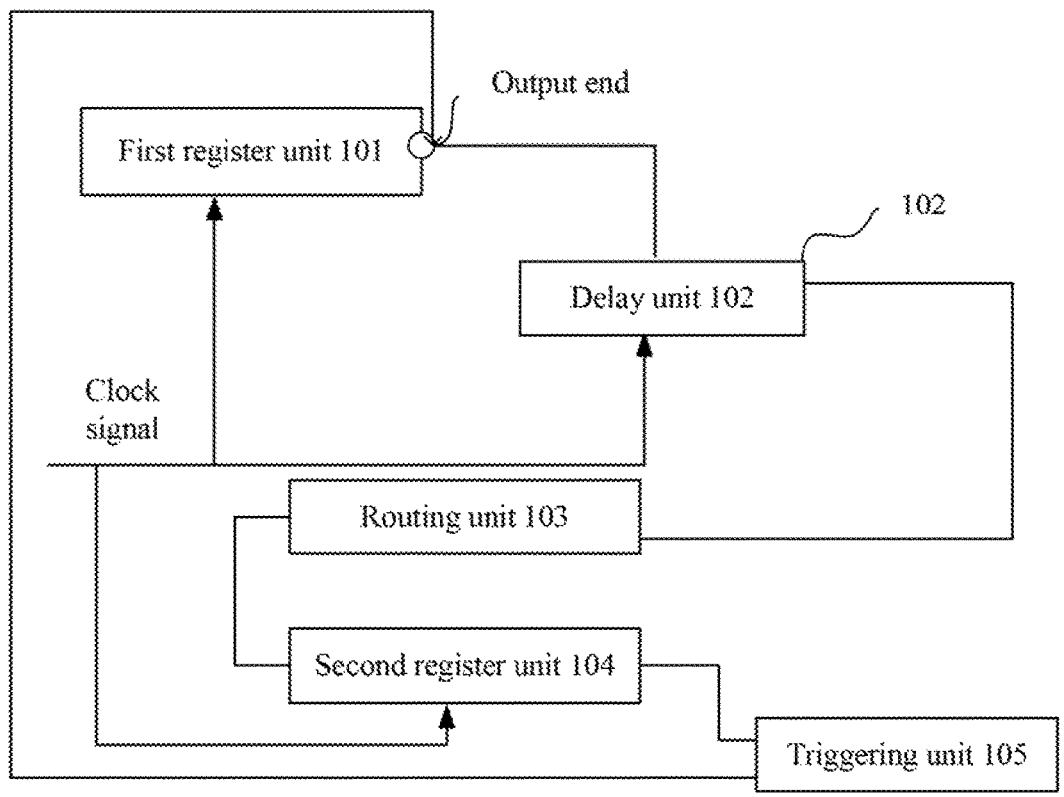
FIG. 2a is Schematic Structural Diagram 1 of a circuit for detecting a security chip operating state according to an embodiment of the present invention.

As shown in FIG. 2a, an embodiment of the present invention provides a circuit for detecting a security chip operating state, including: a first register unit 101, a triggering unit 105 and a delay unit 102 that are connected to the first register unit 101, a routing unit 103 connected to the delay unit 102, and a second register unit 104 connected to the routing unit 103. The second register unit 104 is connected to the triggering unit 105.

The first register unit 101 is configured to: when a clock signal is valid, obtain a first signal according to a triggering signal that is input to the first register unit 101, and output the first signal to the delay unit 102 and a second register unit 104; the delay unit 102 is configured to: delay the first signal for different time periods to generate multiple delayed signals, and when the clock signal is valid, generate multiple second signals according to the multiple delayed signals; the routing unit 103 is configured to: select one second signal from the multiple second signals, and output the selected second signal to the second register unit 104; the second register unit 104 is configured to: when the clock signal is valid, generate a third signal according to the received second signal, and output the third signal to the triggering unit 105; and the triggering unit 105 is configured to: perform logical operation on the third signal and the first signal to obtain a level signal, and determine, according to the level signal, whether to output an alarm signal.

This embodiment of the present invention provides the circuit for detecting a security chip operating state, including: the first register unit, the triggering unit and the delay unit that are connected to the first register unit, the routing unit connected to the delay unit, and the second register unit connected to the routing unit, where the second register unit is connected to the triggering unit. In this embodiment of the present invention, the first signal is delayed to obtain the multiple delayed signals, and the multiple second signals are generated according to the multiple delayed signals. One second signal is selected from the multiple second signals, and the selected second signal is output to the second register unit to obtain the third signal, and the logical operation is performed on the third signal and the first signal to obtain the level signal. It is determined, according to the level signal, whether to output the alarm signal. In this embodiment of the present invention, each unit may be implemented by using a digital circuit, and therefore a size of the circuit can be reduced, so that it is difficult to identify the circuit from a security chip layout, and reliability of a security chip is improved. Further, each digital circuit is an active device, and signal transmission of the active device is affected by a temperature, a voltage, a process, and the like. Therefore, it can be determined, by determining a delay of the first signal transmitted in a delay link, whether an operating state of the circuit provided in this embodiment of the present invention for detecting a security chip operating state is a normal operating condition.

Figure 2B:
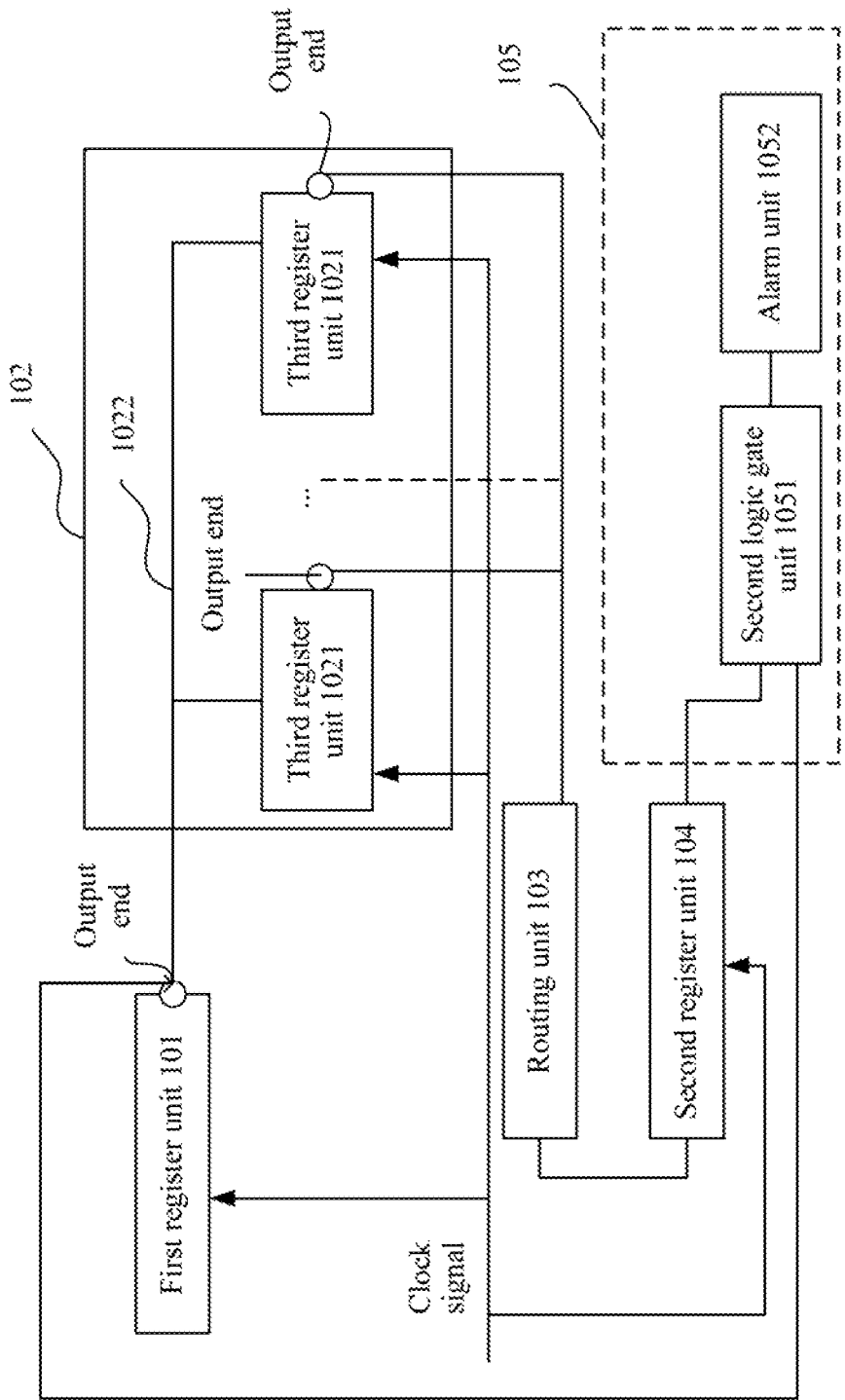
FIG. 2b is Schematic Structural Diagram 2 of a circuit for detecting a security chip operating state according to an embodiment of the present invention.

Optionally, as shown in FIG. 2b, the delay unit 102 includes at least one third register unit 1021 and a delay link 1022 connected to each of the at least one third register unit 1021.

The delay link 1022 is configured to: delay the first signal for different time periods to generate multiple delayed signals, and transfer the multiple delayed signals to different third register units.

Each third register unit is configured to: receive the delayed signal, and when the clock signal is valid, generate the second signal according to the delayed signal transferred to the third register unit.

Optionally, as shown in FIG. 2b, the triggering unit 105 includes a second logic gate unit 1051 and an alarm unit 1052, the second logic gate unit 1051 is connected to the first register unit 101, the alarm unit 1052 is connected to the second logic gate unit 1051, and the second logic gate unit 1051 is further connected to the second register unit 104.

The second logic gate unit 1051 is configured to: perform the logical operation on the third signal and the first signal to obtain the level signal, and send the level signal to the alarm unit 1052; and the alarm unit 1052 is configured to determine, according to the level signal, whether to output the alarm signal.

The delayed signals for different time periods are a performance boundary indication of the circuit provided in this embodiment of the present invention for detecting a security chip operating state. Therefore, the first signal is transferred to each third register unit by using the delay link, so that when the clock signal is valid, each third register unit generates the second signal according to the received first signal. Then, the routing unit selects one second signal from second signals generated by all third register units, and outputs the selected second signal to the second register unit. Because the multiple delayed signals for different time periods are generated after the first signal passes through the delay link, a delay of the delayed signal that is input to each third register unit is different. The second signal finally generated by each third register unit has a different delay. In this way, a delay of a signal that is input to the second register unit can be changed by using the routing unit. Therefore, a performance boundary of the circuit for detecting a security chip operating state is changed. The delayed signals for different time periods cause different performance boundaries of the circuit for detecting a security chip operating state.

Optionally, the performance boundary of the circuit for detecting a security chip operating state may be changed specifically by using the routing unit in this embodiment of the present invention. Specifically, the routing unit 103 is configured to select a target third register unit from at least one third register unit, so as to change the performance boundary of the circuit for detecting a security chip operating state.

For example, the alarm unit 1052 provided in this embodiment of the present invention is specifically configured to: when the level signal is a high level signal, output an alarm signal.

Figure 3:
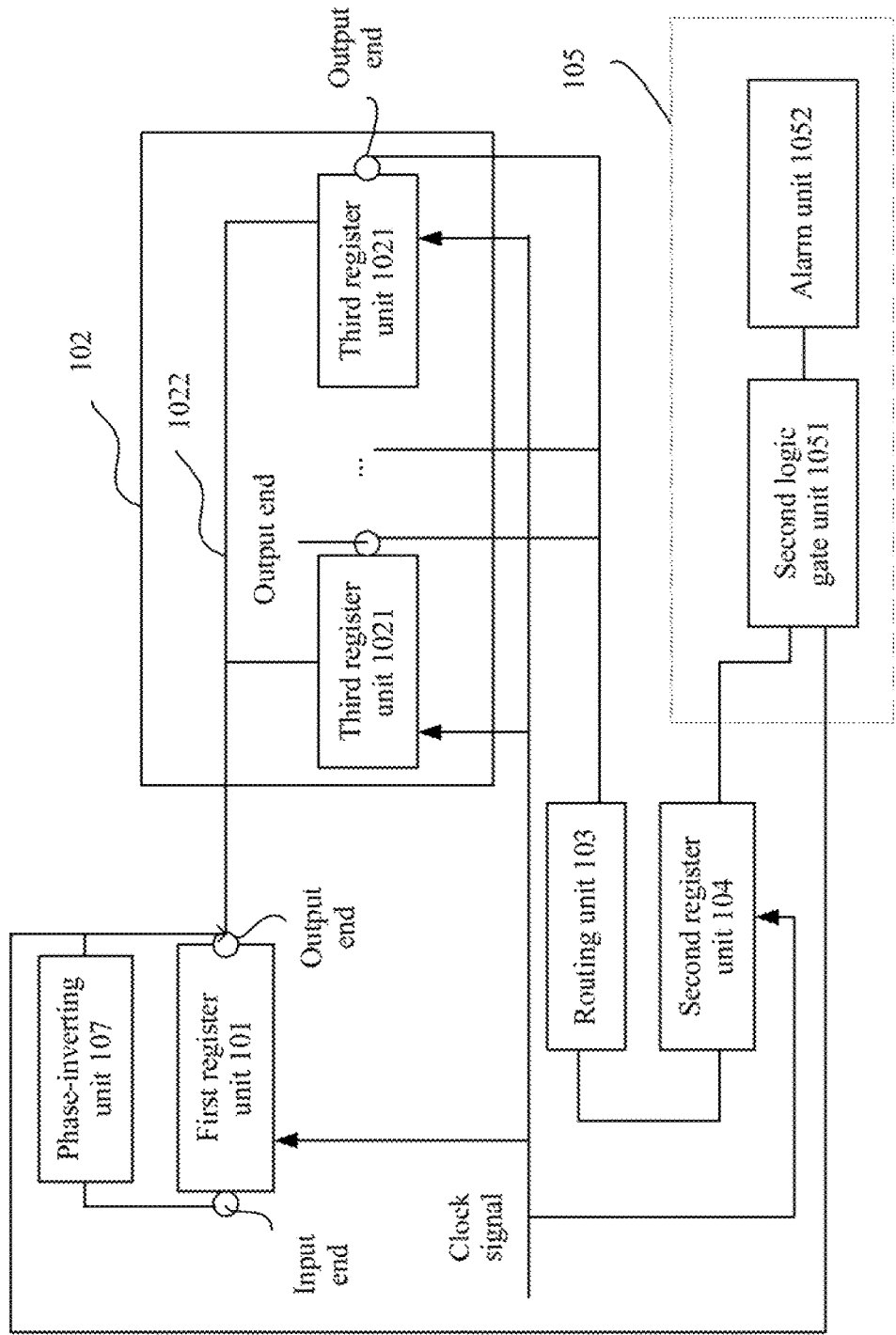
FIG. 3 is Schematic Structural Diagram 3 of a circuit for detecting a security chip operating state according to an embodiment of the present invention.

Optionally, with reference to FIG. 2, as shown in FIG. 3, the circuit provided in this embodiment of the present invention further includes a phase-inverting unit 107. An output end of the phase-inverting unit 107 is connected to an input end of the first register unit, and an input end of the phase-inverting unit 107 is connected to an output end of the first register unit. The phase-inverting unit 107 is configured to: invert a phase of the first signal that is output from the output end of the first register unit, and input a signal obtained by means of the phase inversion to the input end of the first register unit. This can ensure that a signal that is input to the first register unit and a signal that is output by the first register unit always maintain opposite states.

For example, the phase-inverting unit in this embodiment of the present invention may be implemented by using a phase inverter. Specifically, an input end of the phase inverter is connected to the output end of the first register unit, and an output end of the phase inverter is connected to the input end of the first register unit.

Figure 4:
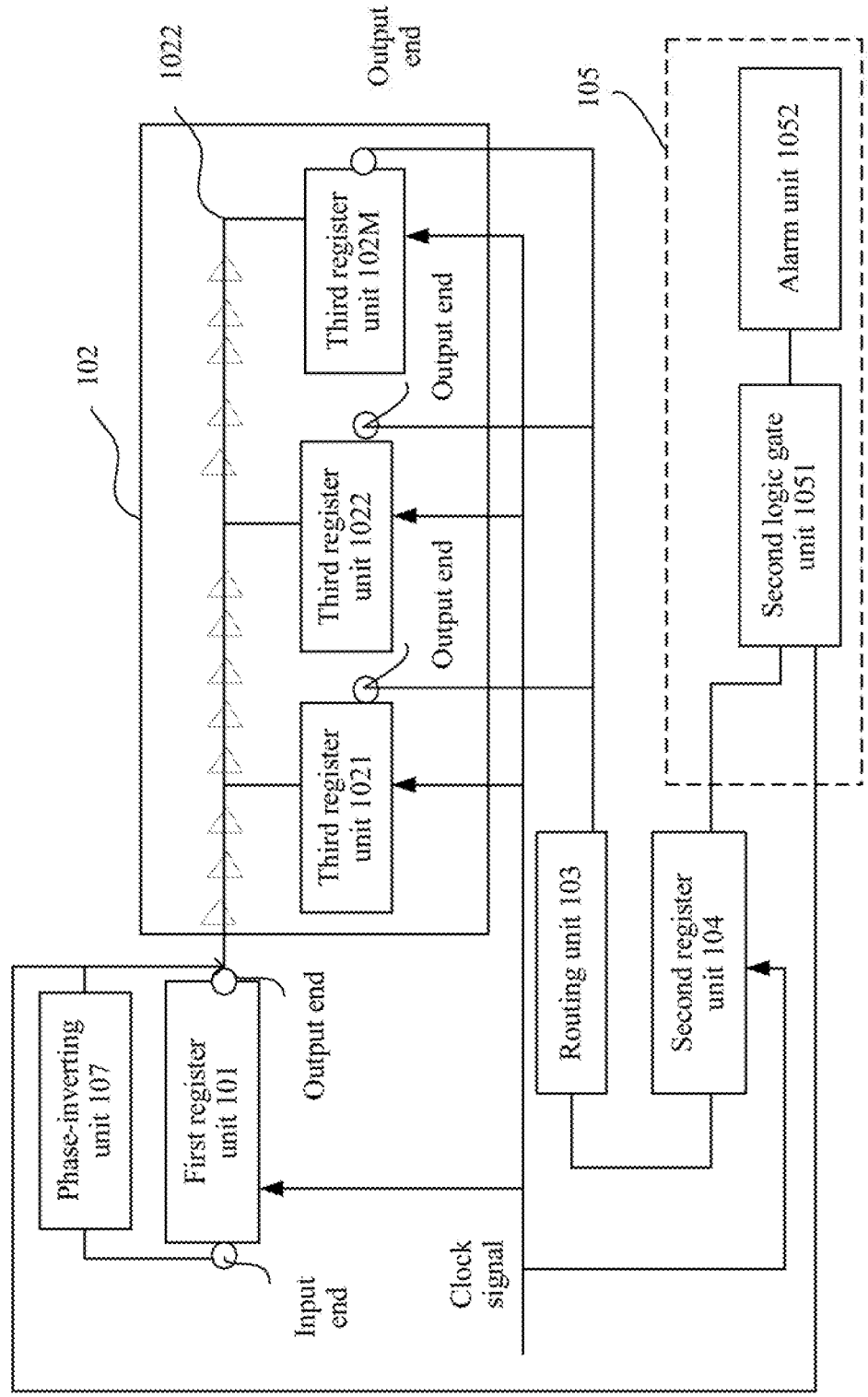
FIG. 4 is Schematic Structural Diagram 4 of a circuit for detecting a security chip operating state according to an embodiment of the present invention.

Optionally, with reference to FIG. 3, as shown in FIG. 4, the delay link includes multiple delay elements, and each delay element is configured to delay, for a preset cycle, a signal that is input to the delay element, so that delayed signals for different time periods are generated after the first signal passes through different quantities of delay elements.

To ensure that each third register unit can collect the delayed signal transmitted in the delay link, in this embodiment of the present invention, when one delay element exists between every two adjacent third register units, a quantity of the delay elements in this embodiment of the present invention is equal to a quantity of the third register units. For example, when merely one third register unit exists in this embodiment of the present invention, the quantity of the delay elements is 1.

Specifically, the quantity of the delay elements in this embodiment of the present invention may be determined according to the quantity of the delay elements between every two adjacent third register units and a quantity of delay elements between the first register unit and one third register unit that is nearest to the first register unit (one third register unit that is nearest to the first register unit may be understood as a third register unit with a shortest delay in receiving the delayed signal, for example, a third register unit 10211 in FIG. 4).

The delay element in this embodiment of the present invention is configured to delay, for the preset cycle, the first signal that passes through the delay element, and a specific structure of the delay element is not limited in this embodiment of the present invention, provided that the delay element can delay, for the preset cycle, the first signal that passes through the delay element. For example, the delay element in this embodiment of the present invention may be a buffer (BUFFER).

The time period in this embodiment of the present invention is a time in which the first signal that is output from the first register unit is transmitted, in the delay link, to an input end of each third register unit. For example, as shown in FIG. 4, a time period 1 may represent a time in which the first signal that is output from the first register unit is transmitted, in the delay link 1022, to the first third register unit 10211, and a time period 2 may represent a time period in which the first signal that is output from the first register unit is transmitted, in the delay link, to the second third register unit 10212. For example, if the first signal that is output from the first register unit 101 is transferred to the first third register unit 10211 through five delay elements in the delay link (FIG. 4 is merely an example, and a quantity of the delay elements in an actual circuit needs to be determined according to the performance boundary of the circuit for detecting a security chip operating state), the time period 1 may indicate that the first signal is transferred to the third register unit 10211 after being delayed for five preset cycles. If the first signal that is output from the first register unit is transferred to the third register unit 10212 through 10 delay elements in the delay link, the time period 2 may indicate that the first signal is transferred to the third register unit 10212 after being delayed for 10 preset cycles. Likewise, five delay elements exist between the third register unit 10211 and the third register unit 10212.

Specifically, a quantity of the delay elements included in each time period is not limited in this embodiment of the present invention, and specifically, a delay cycle of the first signal may be set according to an actual requirement. Optionally, in this embodiment of the present invention, each delay element is configured to delay the first signal for the preset cycle. Certainly, a quantity of the delay elements between every two adjacent third register units 1021 may be the same or different, and this embodiment of the present invention sets no limitation thereto.

Optionally, the first register unit, the second register unit, and the third register unit all use a D trigger. An output end of the D trigger is a Q end, an input end of the D trigger is a D end, and a triggering end R is configured to receive the clock signal.

Optionally, the routing unit in this embodiment of the present invention is specifically configured to determine the target third register unit from the at least one third register unit. Therefore, any routing unit that can implement the foregoing function may be used as the routing unit provided in this embodiment of the present invention. For example, the routing unit in this embodiment of the present invention uses a MUX multiplexer.

It should be noted that, the first register unit, the second register unit, and the third register unit in this embodiment of the present invention use the same clock signal and have the same voltage and temperature.

It should be noted that, any register unit in this embodiment of the present invention may include one register unit, or the register unit that meets an actual requirement may include two or more register units. Any logic gate unit in this embodiment of the present invention may include one logic gate unit, or the logic gate unit that meets an actual requirement may include two or more register units. Any MUX multiplexer in this embodiment of the present invention may include one MUX multiplexer, or the MUX multiplexer that meets an actual requirement may include two or more MUX multiplexers. Specifically, settings may be performed according to an actual use requirement, and this embodiment of the present invention sets no limitation.

Optionally, a second logic gate unit and a first logic gate unit use an XOR gate circuit.

Both the third signal and the first signal have two states: a high level and a low level. If a setting for generating an alarm by an alarm circuit is defined as "an alarm is generated when a high level signal (1) that is output from the second logic gate unit is received", and a setting for not generating an alarm is defined as "no alarm is generated when a low level signal (0) that is output from the second logic gate unit is received", the circuit for detecting a security chip operating state has the following several alarm states in total, and the alarm states are specifically listed in Table 1-1.

TABLE 1-1

|  | Level signal ("1" is an alarm state, and "0" is a no-alarm state) | | | |
| --- | --- | --- | --- | --- |
| Third signal | 1 | 0 | 1 | 0 |
| First signal | 1 | 0 | 0 | 1 |
| XOR gate circuit output | 0 | 0 | 1 | 1 |

Figure 5:
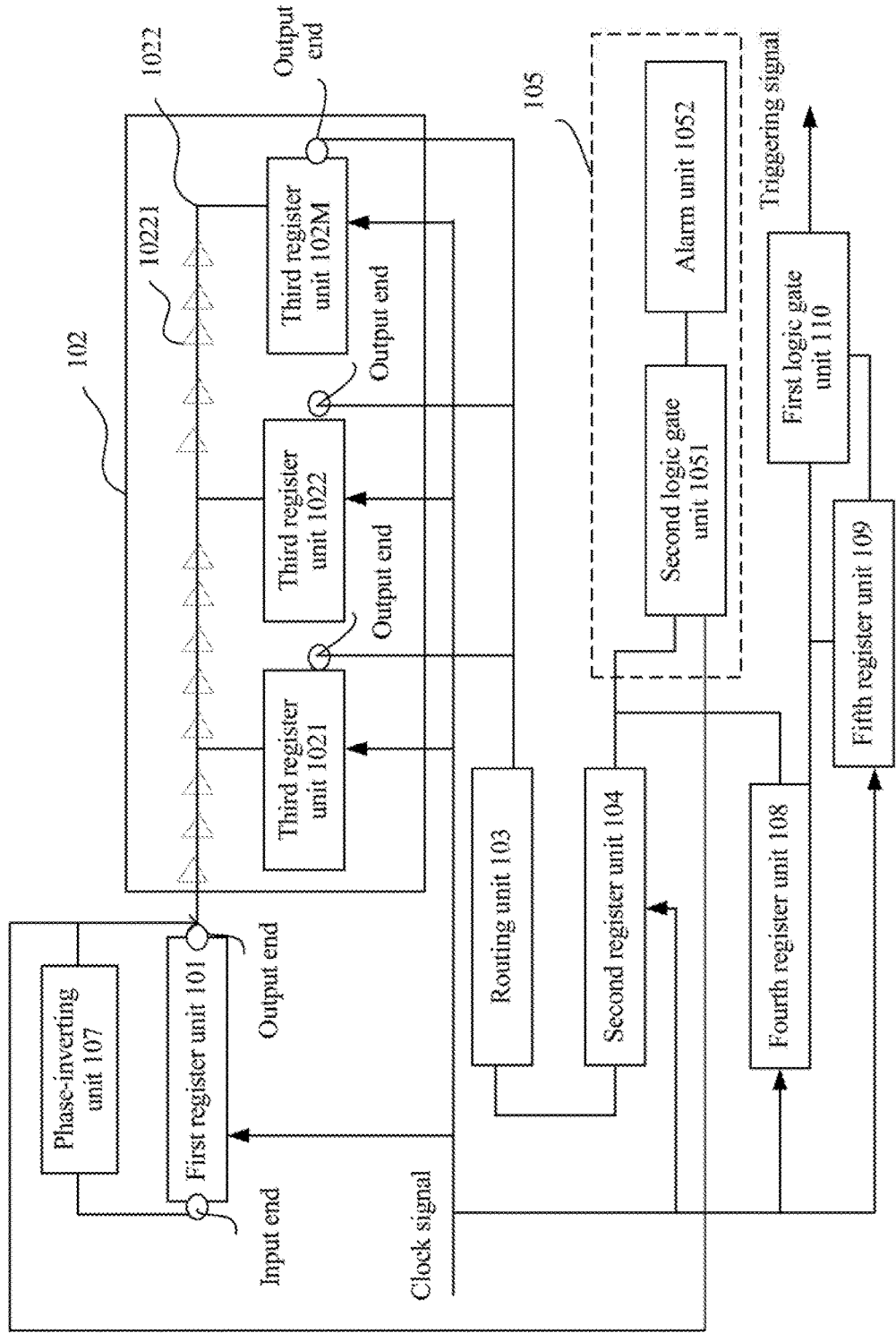
FIG. 5 is Schematic Structural Diagram 5 of a circuit for detecting a security chip operating state according to an embodiment of the present invention.

Optionally, as shown in FIG. 5, the circuit provided in this embodiment of the present invention further includes:

a fourth register unit 108, a fifth register unit 109, and a first logic gate unit 110, where the fourth register unit 108 is configured to receive a third signal that is output from the second register unit 104, and when the clock signal is valid, generate a fourth signal, and output the fourth signal to the fifth register unit 109 and the first logic gate unit 110.

The fifth register unit 109 is configured to: receive the fourth signal that is output from the fourth register unit 108, and when the clock signal is valid, generate a fifth signal according to the fourth signal, and output the fifth signal to the first logic gate unit 110.

The first logic gate unit 110 is configured to generate a triggering signal according to the fourth signal and the fifth signal, where the triggering signal is used to indicate that an internal circuit of the circuit is normal.

Figure 6:
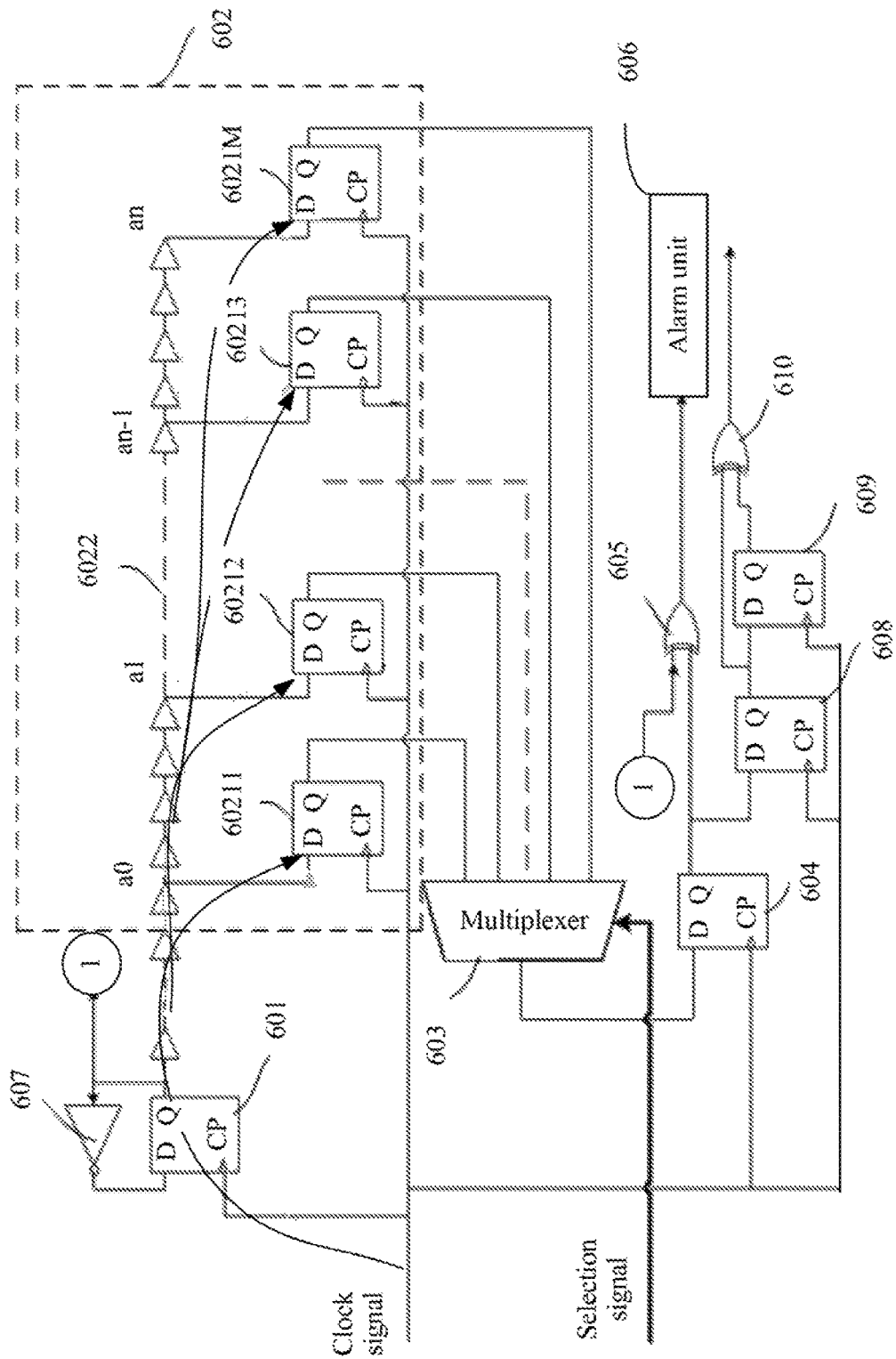
FIG. 6 is Schematic Structural Diagram 6 of a circuit for detecting a security chip operating state according to an embodiment of the present invention.

As shown in FIG. 6, FIG. 6 shows a specific circuit of the circuit for detecting a security chip operating state provided in this embodiment of the present invention, and the specific circuit is referred to as an OCM (Operating Condition Monitor) below. In FIG. 6, ① indicates that an output signal of a first trigger 601 is output from a Q end of the first trigger 601 to one input end of a first XOR gate circuit 605. Multiple delay elements exist between a0 and a1 in FIG. 6, and multiple delay elements exist between an~1 and an.

The first register unit 101 shown in FIG. 2 to FIG. 5 may be implemented by using the first trigger 601 in FIG. 6. Each third register unit shown in FIG. 2 to FIG. 5 may be implemented by using a third trigger 6031 in FIG. 6. The routing unit 103 shown in FIG. 2 to FIG. 5 may be implemented by using a multiplexer 603 in FIG. 6. The second register unit 104 shown in FIG. 2 to FIG. 5 may be implemented by using a second trigger 604 in FIG. 6. The second logic gate circuit 1051 shown in FIG. 2 to FIG. 5 may be implemented by vising the first XOR gate circuit 605 in FIG. 6. The fourth register unit 108 shown in FIG. 2 to FIG. 5 may be implemented by using a fourth trigger 608 in FIG. 6. The fifth register unit 109 shown in FIG. 2 to FIG. 5 may be implemented by using a fifth trigger 609. The first logic gate circuit 110 shown in FIG. 2 to FIG. 5 may be implemented by using a second XOR gate circuit 610.

The fourth trigger 608, the fifth trigger 609, and the second XOR gate circuit 610 are configured to determine whether an internal device of the OCM circuit is normal.

In this embodiment of the present invention, an operating state of the OCM circuit may be changed by energy injection in a manner such as a laser or electromagnetic induction.

In the circuit shown in FIG. 6, a sensor portion of the circuit includes the first trigger 601 to a target third trigger (a third trigger 60213 shown in FIG. 6).

When a delayed signal generated after a first signal that is output from the Q end (output end) of the first trigger 601 passes through a delay link reaches a D end (input end) of the first third trigger (a third trigger 60211 shown in FIG. 6), if an error between a signal delay of the delayed signal that is input to the third trigger 60211 and a clock cycle of a clock signal is less than a preset error (that is, the error between the signal delay and the clock cycle of the clock signal is slightly less than the clock cycle of the clock signal), delays of the first signal that is output from the Q end of the first trigger 601 increase progressively from the second third trigger (a third trigger 60212 shown in FIG. 6) to the $M^{th}$ third trigger (a third trigger 6021M shown in FIG. 6) and are all greater than the clock cycle of the clock signal.

When a clock frequency (clock frequency=1/clock cycle) of the clock signal abruptly increases (that is, when the clock cycle of the clock signal, abruptly decreases), or an operating voltage of the OCM circuit provided in this embodiment of the present invention abruptly decreases, in one clock cycle, a second signal selected by a multiplexer cannot maintain a state consistent with that of the first signal that is output by the first trigger 601, and therefore the first XOR gate circuit 605 outputs a high level, and an alarm unit 606 sends an alarm signal.

Optionally, different selection signals are input to the routing unit, and delayed signals that are delayed for different time periods may be input to each third trigger. Then, each third trigger generates the second signal, and by using the multiplexer 603, one second signal is selected from the second signals generated by all third triggers, and the second signal is transferred to a D end of the second trigger 604. When the clock signal is valid, the second trigger 604 generates a third signal, and the third signal is output to the first XOR gate circuit 605 by using a Q end of the second trigger 604. In this way, a proper target third trigger can be selected by using the multiplexer 603, so as to change a performance boundary (that is, a performance boundary of the OCM circuit) of a target PVTF (Process, Voltage, Temperature, Frequency, process, voltage, temperature, and frequency) monitored by the detection circuit.

It should be noted that, in this embodiment of the present invention, that the clock signal is valid indicates a high level state of each clock cycle. At a rising edge moment of the clock signal, an output signal of each register may be determined according to phase inversion of an input signal.

For example, in this embodiment of the present invention, the third trigger 60213 is merely used as an example to describe a sequence diagram of a level signal that is output by a first logic unit when a frequency of the OCM circuit is changed. For each third register unit, both its operating principle and process are the same as those of the third trigger 60213. Therefore, the third trigger 60213 is used as an example in this embodiment of the present invention, and has no instructive meaning.

Figure 7:
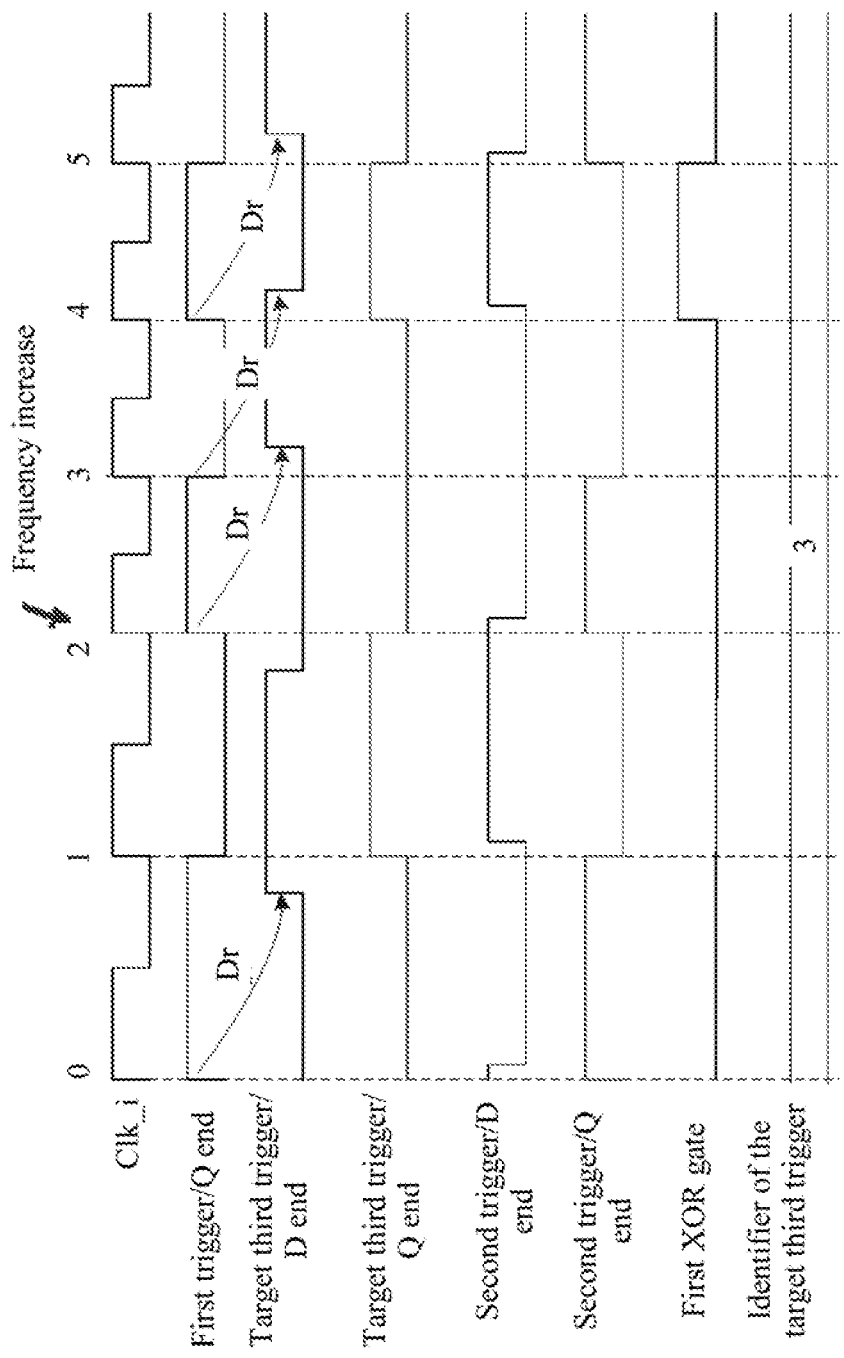
FIG. 7 is a sequence diagram of a level signal that is output by a second logic gate unit when a frequency of a clock signal is changed according to an embodiment of the present invention.
Figure 8:
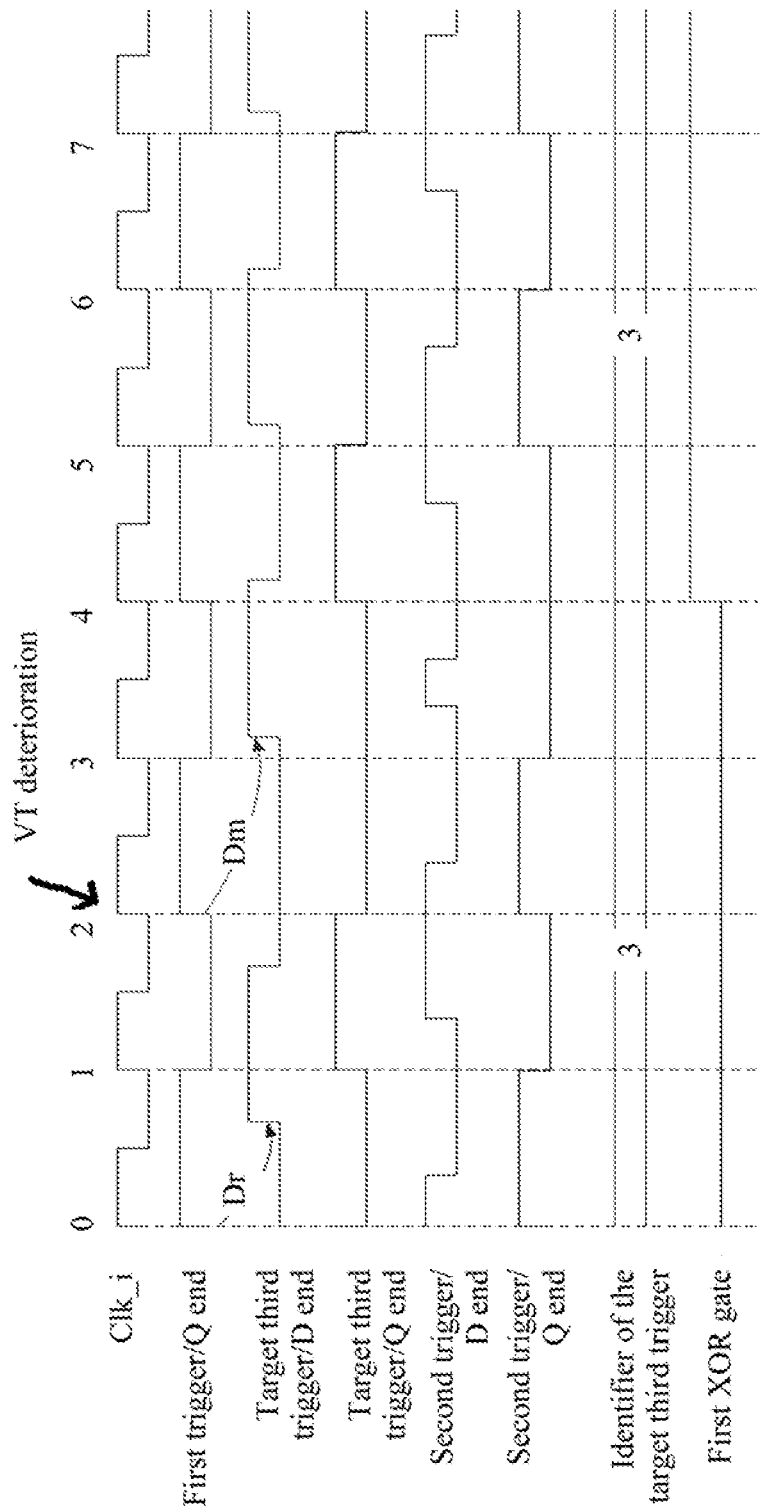
FIG. 8 is a sequence diagram of a level signal that is output by a second logic gate unit when a voltage/temperature is changed according to an embodiment of the present invention.

For example, with reference to FIG. 7 and FIG. 8, the following separately describes instances in which the third trigger 60213 under changes of time sequence detects whether the circuit for detecting a security chip operating state sends an alarm signal when the frequency of the clock signal is changed or the temperature/voltage is changed.

As shown in FIG. 7, FIG. 7 shows a sequence diagram of an instance in which the alarm unit generates an alarm when the frequency of the clock signal is changed.

When a PVT (Process, Voltage, Temperature, process, voltage, and temperature) is normal, a transmission delay, in the delay link 6022, of the first signal that is output from the Q end of the first trigger 601 is denoted as Dr, as shown by an arrow marked by Dr in FIG. 7 and FIG. 8.

The first trigger 601, each delay element in the delay link 6022, and a phase inverter 607 in FIG. 6 are all active devices, and a signal transmission delay of the active device is affected by the PVT. Therefore, when the PVT deteriorates, a transmission delay that is denoted as Dm and that is of the first signal in the delay link 6022 increases, as shown by an arrow marked by Dm in FIG. 8.

When the OCM circuit operates, the first signal that is output from the Q end (output end) of the first trigger 601 is phase-inverted once at each rising edge of the clock signal (Clk_i) (as shown in sequence diagrams of Clk_i and the first trigger/the Q end in FIG. 7 and FIG. 8).

At a moment 1, the clock signal is at a rising edge, and the first trigger/the Q end is at a high level before the moment 1. Therefore, when the clock signal enters the moment 1, the signal that is output from the first trigger/the Q end is changed from the high level to a low level (the signal that is output from the first trigger/the Q end between the moment 1 and a moment 2 shown in FIG. 7). The signal that is output from the Q end of the first trigger 601 is transferred to a D end (input end) of the third trigger 60213 through the delay link 6022, and at each rising edge of the clock signal, the signal at the D end of the third trigger 60213 is transferred to a Q end (output end) of the third trigger 60213.

As shown in FIG. 7, at the moment 1, because the signal at the D end of the third trigger is at the high level, the signal that is output from the Q end of the third trigger 60213 is at the high level at the moment 1.

As shown in FIG. 7, an operating frequency of the OCM circuit does not change between a moment 0 and a moment 2, but at the moment 2, the operating frequency of the OCM circuit increases (as shown in FIG. 7, a cycle between moments decreases after the moment 2). At the moment 2, the signal that is input from the D end to the Q end of the third trigger 60213 is at a low level, and therefore, the signal that is output from the Q end of the third trigger is at a low level at the moment 2.

At a moment 3, because the signal that is output from the D end of the third trigger 60213 is still at a low level, the signal that is output from the Q end of the third trigger 60213 is also at a low level at the moment 3. Therefore, a delay from the first trigger 601 to the third trigger 60213 exceeds one clock cycle. In one clock cycle, the third trigger 60213 cannot maintain a state consistent with that of the first signal that is output from the Q end of the first trigger 601. As a result, in one clock cycle, a state of the signal that is output from the Q end of the second trigger 604 upon triggering of the clock signal and that is input to the D end of the second trigger 604 is asynchronous with a state of the first signal that is output from the Q end of the first trigger 601. Therefore, at a moment 4, the first XOR gate circuit 605 outputs a high level signal, as shown in FIG. 7.

Between the moment 3 and the moment 4, the signal that is input from the Q end of the first trigger to the first XOR gate circuit 605 is a low level signal, and the signal that is input from, the Q end of the second trigger to the first XOR gate circuit 605 is a low level signal. Therefore, a level signal that is output from the first XOR gate circuit 605 between the moment 3 and the moment 4 (one clock cycle) is a low level signal, and the alarm unit 606 does not send an alarm signal.

Between the moment 4 and a moment 5, a level signal that is input from the Q end of the first trigger 601 to the first XOR gate circuit 605 is a high level signal, and a signal that is input from the Q end of the second trigger to the first XOR gate circuit 605 is a low level signal. Therefore, the level signal that is output from the first XOR gate circuit 605 between the moment 4 and the moment 5 is at a high level, and at the moment 4, the alarm unit 606 sends an alarm signal.

It should be noted that, any delay from the Q end of the third trigger to a second trigger 603 may be ignored.

As shown in FIG. 8 (for example, the third trigger 60213 is used as the target third trigger), FIG. 8 is a schematic diagram of operation of the OCM circuit when a delay of the delay link increases due to a voltage decrease, a temperature change, and the like.

In FIG. 8, between a moment 0 and a moment 2, the operating state of the OCM circuit is normal (that is, both a temperature and a voltage are in a rated range). Therefore, between the moment 0 and a moment 1, because a delay of the first signal (a high level signal) that is output from the Q end of the first trigger 601 is Dr, the D end of the third trigger 60213 should maintain a state consistent with that of the first signal after the delay Dr. Therefore, between a moment Dr and a moment 1+Dr, the signal that is output from the D end of the third trigger 60213 is a high level signal.

At the moment 1, when the clock signal at the Q end of the third trigger 60213 is valid, a state of the signal that is output from the D end of the third trigger 60213 is collected, that is, a high level state is maintained. Therefore, between the moment 1 and the moment 2, the signal that is output from the Q end of the third trigger 60213 is in the high level state.

Between the moment 1 and the moment 2, the first signal that is output from the Q end of the first trigger 601 is a low level signal. Therefore, between the moment 1 and the moment 2, a signal that is generated after the first signal passes through the delay link and that is input to the D end of the third trigger 60213 is still a low level signal.

At the moment 2, when the clock signal is valid, because the signal that is output from the Q end of the third trigger 60213 is changed from a high level signal to a low level signal, at the moment 1, the signal that is output from the Q end of the second trigger 604 is changed from a high level signal to a low level signal. At the moment 2, the signal that is output from the Q end of the second trigger 604 is changed from a low level signal to a high level signal. Because input to the first XOR gate circuit 605 is respectively the signal at the Q end of the second trigger 604 and the first signal that is output from the Q end of the first trigger 601, it may be seen from FIG. 8 that, between the moment 0 and the moment 1, a state of the signal at the Q end of the second trigger 604 is consistent with that of the signal at the Q end of the first trigger 601, and both of the signals are high level signals. Therefore, the level signal that is output from the first XOR gate circuit 605 is a low level signal, and the alarm circuit 606 does not send an alarm signal.

In addition, between the moment 1 and the moment 2, the state of the signal at the Q end of the second trigger 604 is consistent with that of the signal at the Q end of the first trigger 601, and both of the signals are low level signals.

Therefore, the level signal that is output from the first XOR gate circuit 605 is a low level signal, and the alarm circuit 606 does not send an alarm signal.

In conclusion, it may be learned that, between the moment 0 and the moment 2, the alarm unit 606 does not send an alarm signal.

At the moment 2, due to the operating state (for example, the voltage decreases or the temperature deteriorates) of the OCM circuit, the transmission delay of the first signal in the delay link increases, as shown in Dm in FIG. 8. As a result, a delay of the first signal that is output from the Q end of the first trigger 601 and that reaches the D end of the third trigger 60213 through the delay link increases (it may be seen from FIG. 8 that the delay is 1−Dr+Dm). Because Dm is greater than Dr, the delay of the first signal that is output from the Q end of the first trigger 601 and that reaches the D end of the third trigger 60213 through the delay link exceeds one clock cycle.

Therefore, after the moment 2, in one clock cycle, the third trigger 60213 cannot maintain a state consistent with that of the first signal that is output from the first trigger 601. It may be seen from FIG. 8 that, at a moment 3, a state of the first signal that is output from the Q end of the first trigger 601 is a high level signal, and in addition, the delay of the OCM circuit increases. Therefore, at the moment 3, a state of the signal that is output from the D end of the third trigger 60213 is a low level signal, and at the moment 3, the signal that is output from the Q end of the third trigger 60213 is also a low level signal. Therefore, at the moment 3, the signal that is output from the Q end of the second trigger 604 is changed from a high level to a low level.

Between the moment 3 and a moment 4, the first signal that is output from the Q end of the first trigger 601 is a low level signal, and the signal that is output from the Q end of the second trigger 604 is a low level signal. Therefore, between the moment 3 and the moment 4, the first XOR gate circuit 605 outputs a low level signal, and the alarm circuit 606 does not send an alarm signal.

Between the moment 4 and a moment 5, the first signal that is output from the Q end of the first trigger 601 is a high level signal, and the signal that is output from the Q end of the second trigger 604 is a low level signal. Therefore, the level signal that is output from the first XOR gate circuit is a high level signal, and the alarm unit 606 sends an alarm signal.

Figure 9:
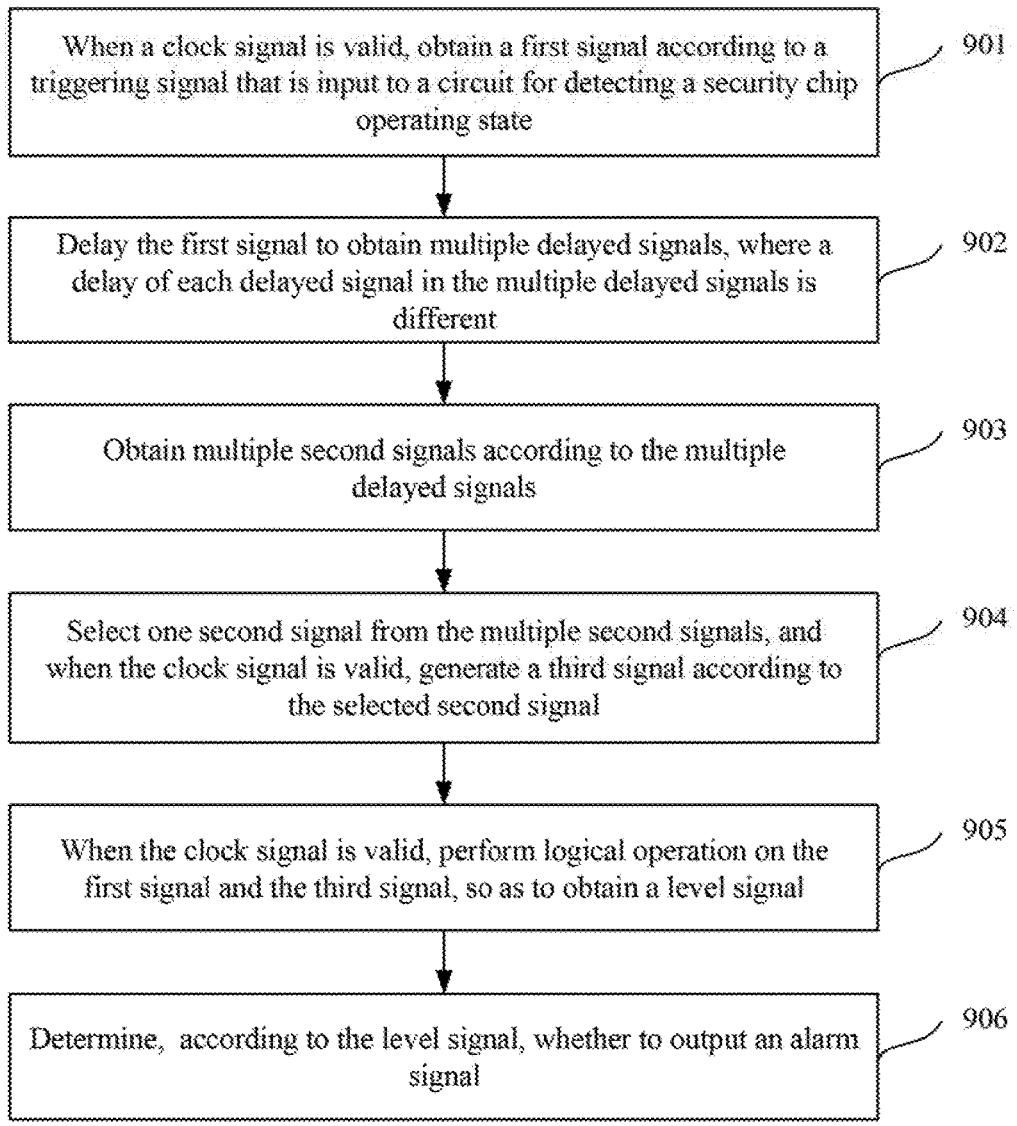
FIG. 9 is a schematic flowchart of a method for detecting a security chip operating state according to an embodiment of the present invention.

An embodiment of the present invention provides a method for detecting a security chip operating state. The method is applied to the foregoing circuit for detecting a security chip operating state. As shown in FIG. 9, the method provided in this embodiment of the present invention includes the following steps.

S901. When a clock signal is valid, obtain a first signal according to a triggering signal that is input to the circuit for detecting a security chip operating state.

S902. Delay the first signal to obtain multiple delayed signals, where a delay of each delayed signal in the multiple delayed signals is different.

S903. Obtain multiple second signals according to the multiple delayed signals.

S904. Select one second signal from the multiple second signals, and when the clock signal is valid, generate a third signal according to the selected second signal.

S905. When the clock signal is valid, perform logical operation on the first signal and the third signal to obtain a level signal.

S906. Determine, according to the level signal, whether to output an alarm signal.

Further, before step S904, the method provided in this embodiment of the present invention further includes:

S907. Receive a selection signal, where the selection signal is used to instruct a routing unit to select one second signal from the multiple second signals.

The selection signal carries an identifier of each third register unit, or in practice, a selection unit includes multiple paths, and each path is connected to one third register unit. Certainly, in this case, the selection signal may carry an identifier of a path connected to a target third register unit.

S908. Select one second signal from the multiple second signals according to the selection signal.

Optionally, after step S901, the method further includes the following steps.

S909. Invert a phase of the first signal that is output in a current clock cycle, so as to determine a triggering signal that is input to the security chip in a next clock cycle.

Optionally, step S906 may be specifically implemented in the following manner:

S9061. When the level signal is a high level signal, output an alarm signal.

Optionally, the method further includes:

S910. When the clock signal is valid, generate a fifth signal according to the third signal.

S911. When the clock signal is valid, generate a sixth signal according to the fifth signal.

S912. Generate a triggering signal according to the fifth signal and the sixth signal, where the triggering signal is used to indicate that an element of the circuit is normal.

Figure 10:
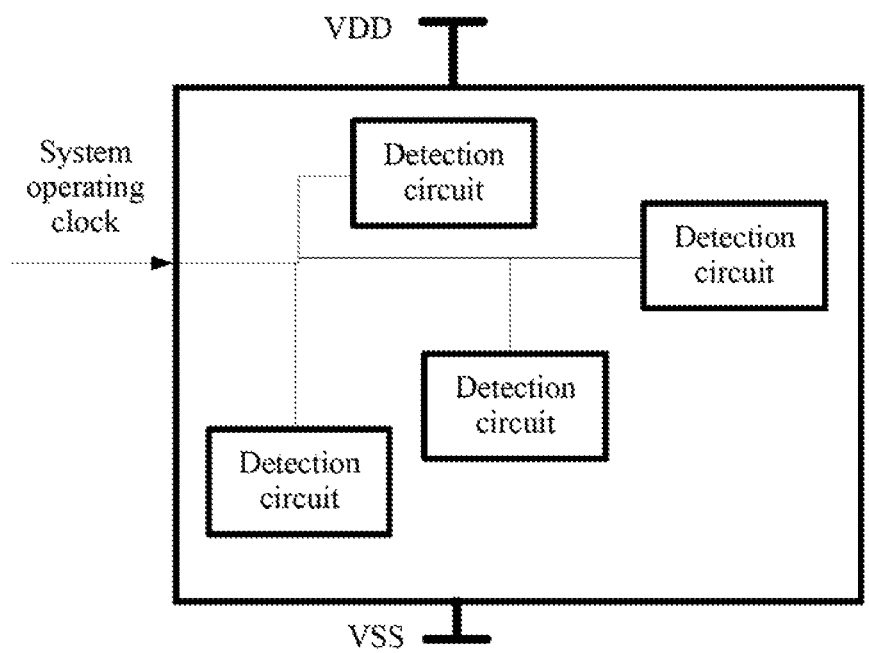
FIG. 10 is a schematic diagram of a detection circuit use instance according to an embodiment of the present invention.

As shown in FIG. 10, an embodiment of the present invention provides a security chip protection circuit. The security chip protection circuit is applied to a security chip, and the security chip includes at least one detection circuit. Any one of the detection circuit is configured to detect a condition state in a preset range, the preset range may be determined according to a detection capability of each defection circuit, and it is determined, according to the condition state, whether to send an alarm signal. The detection circuit uses the circuit for detecting a security chip operating state shown in FIG. 2a, FIG. 2b to FIG. 6, the circuit for detecting a security chip operating state has a same condition state with the security chip, and the condition state includes at least a clock cycle of a clock signal, a power supply, a temperature, and a laser.

It should be noted that a quantity of the at least one detection circuit included in the security chip is not limited in this embodiment of the present invention. When the security chip includes only one detection circuit, the detection circuit may be configured to detect whether an operating state of the entire security chip is a normal operating condition, or may detect whether an operating state of any area (also referred to as a locality) of the security chip is a normal operating condition. When any detection circuit sends an alarm signal, it indicates that the operating state of the security chip is an abnormal operating condition.

In this embodiment of the present invention, the circuit for detecting a security chip operating state is applied to the security chip as a digital circuit and shares same operating conditions, such as an operating clock signal, a power net, and a temperature, with other operating circuits (such as a CPU circuit, an encryption and decryption engine circuit, and a random number generation circuit) in the security chip. Input to each trigger in any detection circuit is an operating clock of a clock signal system of the security chip. An object monitored by any detection circuit includes: a clock signal of the security chip, a system clock frequency, an operating voltage, an operating temperature, and whether energy such as a laser is injected. When a comprehensive level of the clock signal, the operating voltage, or the operating temperature exceeds a withstanding limit of the any detection circuit of the circuit, a level signal that is output from a second logic gate unit of the detection circuit is a high level signal. Therefore, an alarm unit sends an alarm signal.

In this embodiment of the present invention, in the detection circuit, each component uses a digital circuit, so that a size of the detection circuit can be reduced, and two or more detection circuits can be disposed in the security chip. In this way, when the operating state of the security chip is changed only in a locality (for example, a local voltage or temperature change of the chip caused by laser or electromagnetic injection), but the change does not cause an overall operating state change of the security chip (for example, a locality of the security chip is attacked, and consequently a voltage increases; however, the voltage does not affect the entire security chip, or a sensor in the security chip does not detect the voltage increase), an alarm signal can be sent by using a detection circuit in a range of the locality, so as to detect a local operating state exception.

In addition, in this embodiment of the present invention, multiple detection circuits are integrated in the security chip, and an alarm signal can be sent when the operating state of the security chip is abnormal.

An embodiment of the present invention provides a security chip protection circuit detection method. The method is applied to the security chip protection circuit shown in FIG. 10, and the method provided in this embodiment of the present invention includes the following steps.

S1101. Set, according to an input selection signal, a target third register unit selected for each detection circuit, where the selection signal is used to instruct a routing unit to select the target third register unit from at least one third register unit.

S1102. After a security chip is started, if any detection circuit in at least one detection circuit sends an alarm signal, it indicates that the security chip operates in an insecure operating condition at a current moment.

Optionally, before step S1102, the method provided in this embodiment of the present invention further includes:

S1103. Obtain an operating state of each detection circuit in the at least one detection circuit at the current moment.

S1104. Each detection circuit determines, according to a relationship between the operating state of each detection circuit at the current moment and a performance boundary of the detection circuit, whether to send an alarm signal.

Specifically, step S1104 in this embodiment of the present invention may be implemented by using the following steps.

S11041. When an operating state of a first detection circuit in the at least one detection circuit at the current moment is outside a performance boundary of the first detection circuit, the first detection circuit sends an alarm signal, where the first detection circuit is any detection circuit in the at least one detection circuit.

S11042. When an operating state of a first detection circuit in the at least one detection circuit at the current moment is within a performance boundary of the first detection circuit, the first detection circuit does not send an alarm signal, where the first detection circuit is any detection circuit in the at least one detection circuit.

It should should be noted that, in this embodiment of the present invention, each detection circuit has multiple performance boundaries, and the performance boundary may be specifically determined by using a delayed signal that is input to the target third register unit selected by the routing unit in each detection circuit. Certainly, each security chip may also have a performance boundary. For the performance boundary of the security chip, refer to a rated voltage, a rated temperature, and the like of each security chip for determining.

S11043. When an operating state of the first detection circuit in the at least one detection circuit at the current moment is outside the performance boundary of the first detection circuit but within the performance boundary of the security chip, the first detection circuit sends an alarm signal.

Figure 11:
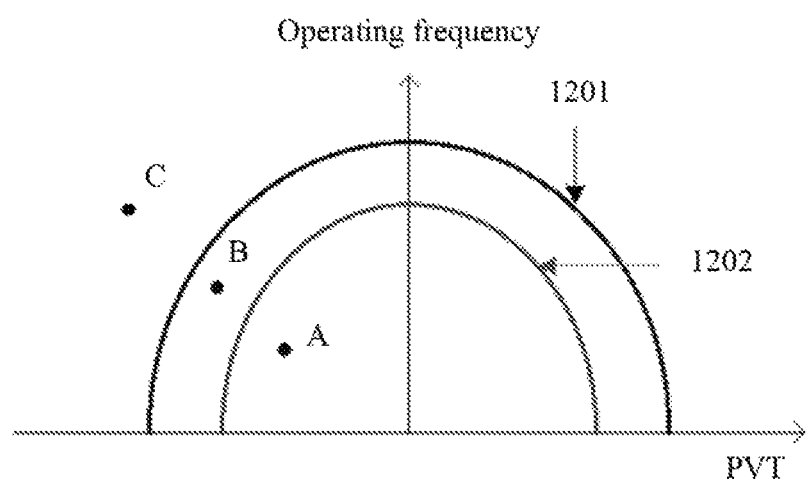
FIG. 11 is a schematic diagram of a security chip detection method according to an embodiment of the present invention.

For example, as shown in FIG. 11, in FIG. 11, a lateral axis represents a PVT (process, voltage, and temperature) plane, a value axis represents a clock frequency of the security chip, and any one point in a coordinate system represents an operating frequency and a PVT condition of the security chip during operation. A curve 1201 represents the performance boundary of the security chip, and a curve 1202 represents a performance boundary of any circuit for detecting a security chip operating state.

In a first aspect, when the operating state of the security chip is within the performance boundary of the circuit for detecting a security chip operating state, as shown in a point A point in FIG. 11, it indicates that an operating condition of the security chip is normal, and each circuit for detecting a security chip operating state in the security chip does not send an alarm signal.

In a second aspect, when the operating state of the security chip is outside the curve 1202 and within the curve 1201, as shown in a point B in FIG. 11, although the operating state of the security chip is a normal condition, the circui t for detecting a security chip operating state sends an alarm signal. This is because a local operating state of the security chip may be changed, but the change does not affect an overall operating state of the security chip. Therefore, provided that the circuit for detecting a security chip operating state detects that an operating state is an abnormal operating condition, an alarm signal is sent.

According to a third aspect, when the operating state of the security chip is outside the curve 1201, as shown in a point C in FIG. 11, in this case, it indicates that there may be an error in the security chip. Therefore, the circuit for detecting a security chip operating state definitely sends an alarm signal.

Optionally, after step S1102, the method provided in this embodiment of the present invention further includes:

S1105. Reset the security chip by using a preset protection measure, so that data stored in the security chip does not leak.

For example, the preset protection measure in this embodiment of the present invention may be resetting an operating circuit of the entire security chip (including a CPU circuit, an encryption and decryption circuit, and a random number generation circuit), so that a security signal is in an initial state. The initial state includes no sensitive information, and all data in a memory bank is erased.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A circuit for detecting a security chip operating state, comprising:
a first hardware register unit, a hardware triggering unit and a hardware delay unit that are connected to the first hardware register unit, a hardware routing unit connected to the hardware delay unit, and a second hardware register unit connected to the hardware routing unit, wherein the second hardware register unit is connected to the hardware triggering unit;
the first hardware register unit is configured to: when a clock signal is valid, obtain a first signal according to a triggering signal that is input to the first hardware register unit, and output the first signal to the hardware delay unit and the second hardware register unit;
the hardware delay unit is configured to: delay the first signal for different time periods to generate multiple delayed signals, and when the clock signal is valid, generate multiple second signals according to the multiple delayed signals;
the hardware routing unit is configured to: select one second signal from the multiple second signals, and output the selected second signal to the second hardware register unit;
the second hardware register unit is configured to: when the clock signal is valid, generate a third signal according to the received second signal, and output the third signal to the hardware triggering unit; and
the hardware triggering unit is configured to: perform logical operation on the third signal and the first signal to obtain a level signal, and determine, according to the level signal, whether to output an alarm signal.

2. The circuit according to claim 1, wherein the hardware routing unit is configured to:
receive a selection signal, wherein the selection signal is used to instruct to select one second signal from the multiple second signals; and
select one second signal from the multiple second signals according to the selection signal.

3. The circuit according to claim 1, wherein the hardware delay unit comprises at least one third hardware register unit and a delay link connected to each of the at least one third hardware register unit;
the delay link is configured to: delay the first signal for the different time periods to generate the multiple delayed signals, and transfer the multiple delayed signals to different third hardware register units; and
each third hardware register unit is configured to: receive the delayed signal, and when the clock signal is valid, generate the second signal according to the delayed signal transferred to the third hardware register unit.

4. The circuit according to claim 1, wherein the hardware triggering unit is configured to:
when the level signal is a high level signal, output an alarm signal.

5. The circuit according to claim 1, wherein the circuit further comprises a hardware phase-inverting unit, an output end of the hardware phase-inverting unit is connected to an input end of the first hardware register unit, and an input end of the hardware phase-inverting unit is connected to an output end of the first hardware register unit; and
the hardware phase-inverting unit is configured to: invert a phase of the first signal that is output from the output end of the first hardware register unit, and input a signal obtained by the phase inversion to the input end of the first hardware register unit.

6. The circuit according to claim 1, wherein the delay link comprises multiple delay elements, and each delay element is configured to delay, for a preset cycle, a signal that is input to the delay element, so that delayed signals for different time periods are generated after the first signal passes through different quantities of delay elements.

7. The circuit according to claim 1, wherein the circuit further comprises:
a fourth hardware register unit, a fifth hardware register unit, and a first hardware logic gate unit, wherein the fourth hardware register unit is connected to the second hardware register unit, the fifth hardware register unit, and the first hardware logic gate unit;
the fourth hardware register unit is configured to: receive the third signal that is output from the second hardware register unit, and when the clock signal is valid, generate a fourth signal, and output the fourth signal to the fifth hardware register unit and the first hardware logic gate unit;
the fifth hardware register unit is configured to: receive the fourth signal that is output from the fourth hardware register unit, and when the clock signal is valid, generate a fifth signal according to the fourth signal, and output the fifth signal to the first hardware logic gate unit; and
the first hardware logic gate unit is configured to generate a triggering signal according to the fourth signal and the fifth signal, wherein the triggering signal is used to indicate that an internal element of the circuit is normal.

8. The circuit according to claim 1, wherein the hardware triggering unit comprises a second hardware logic gate unit and a hardware alarm unit, the second hardware logic gate unit is connected to the first hardware register unit, the hardware alarm unit is connected to the second hardware logic gate unit, and the second hardware logic gate unit is further connected to the second hardware register unit;
the second hardware logic gate unit is configured to: perform the logical operation on the third signal and the first signal to obtain the level signal, and send the level signal to the hardware alarm unit; and
the hardware alarm unit is configured to determine, according to the level signal, whether to output an alarm signal.

9. A method for detecting a security chip operating state, wherein the method is applied to a circuit for detecting a security chip operating state and comprises:
when a clock signal is valid, obtaining a first signal according to a triggering signal that is input to the circuit for detecting a security chip operating state;
delaying the first signal to obtain multiple delayed signals, wherein a delay of each delayed signal in the multiple delayed signals is different;
obtaining multiple second signals according to the multiple delayed signals;
selecting one second signal from the multiple second signals, and when the clock signal is valid, generating a third signal according to the selected second signal;
when the clock signal is valid, performing logical operation on the first signal and the third signal to obtain a level signal; and
determining, according to the level signal, whether to output an alarm signal.

10. The method according to claim 9, wherein before the selecting one second signal from the multiple second signals, the method further comprises:

receiving a selection signal, wherein the selection signal is used to instruct to select one second signal from the multiple second signals; and selecting one second signal from the multiple second signals according to the selection signal.

11. The method according to claim 9, wherein after the obtaining a first signal according to a triggering signal that is input to the circuit for detecting a security chip operating state, the method further comprises:

inverting a phase of the first signal that is output in a current clock cycle, so as to determine a triggering signal that is to be input to the security chip in a next clock cycle.

12. The method according to claim 9, wherein the determining, according to the level signal, whether to output an alarm signal comprises:

when the level signal is a high level signal, outputting an alarm signal.

13. The method according to claim 9, wherein the method further comprises:

when the clock signal is valid, generating a fifth signal according to the third signal;

when the clock signal is valid, generating a sixth signal according to the fifth signal; and generating a triggering signal according to the fifth signal and the sixth signal, wherein the triggering signal is used to indicate that an element of the circuit is normal.

* * * * *